United States Patent
Montreuil

[19]

[11] Patent Number: 5,825,170
[45] Date of Patent: Oct. 20, 1998

[54] MAGNETICALLY COUPLED ALTERNATING STRAY CURRENT NEUTRALIZING METHOD AND SYSTEM

[75] Inventor: Michel Montreuil, St-Charles-de-Bellechasse, Canada

[73] Assignee: Filtre-Expert, Levis, Canada

[21] Appl. No.: 788,262

[22] Filed: Jan. 24, 1997

[51] Int. Cl.⁶ .................. A01J 3/00; H02H 1/04; H02H 3/00; H01F 17/00
[52] U.S. Cl. .................. 323/355; 119/14.03; 307/326; 361/42
[58] Field of Search .................. 119/14.03, 14.08, 119/14.14; 307/326, 327; 361/42, 58; 323/355

[56] References Cited

U.S. PATENT DOCUMENTS

| | | | |
|---|---|---|---|
| 989,596 | 4/1911 | Geppert | 307/95 |
| 1,010,907 | 12/1911 | Hayden | 307/95 |
| 2,483,397 | 10/1949 | Bonner | 171/316 |
| 3,383,520 | 5/1968 | Hoffman | 307/95 |
| 3,636,409 | 1/1972 | Stephens et al. | 317/18 D |
| 3,725,669 | 4/1973 | Tatum | 307/95 |
| 3,726,252 | 4/1973 | Needham et al. | 119/14.08 |
| 3,769,926 | 11/1973 | Race | 114/5 R |
| 3,773,016 | 11/1973 | Needham et al. | 119/14.08 |
| 3,837,318 | 9/1974 | Duncan et al. | 119/14.08 |
| 3,870,925 | 3/1973 | Huey et al. | 317/9 R |
| 3,874,337 | 4/1975 | Umbaugh et al. | 119/14.15 |
| 3,878,819 | 4/1975 | Harman | 119/14.08 |
| 3,919,975 | 11/1975 | Duncan | 119/14.05 |
| 3,978,460 | 8/1976 | Jaquith | 340/227 R |
| 4,010,715 | 3/1977 | Robar et al. | 119/14.14 |
| 4,034,711 | 7/1977 | Bender et al. | 119/14.11 |
| 4,047,500 | 9/1977 | Bender et al. | 119/14.11 |
| 4,091,291 | 5/1978 | Foster et al. | 307/95 |
| 4,355,595 | 10/1982 | Ackerman et al. | 119/14.03 |
| 4,372,249 | 2/1983 | Kiestra et al. | 119/14.17 |
| 4,391,222 | 7/1983 | Icking et al. | 119/14.17 |
| 4,398,188 | 8/1983 | Feigal et al. | 340/650 |

(List continued on next page.)

FOREIGN PATENT DOCUMENTS

| | | |
|---|---|---|
| 1174195 | 9/1984 | Canada . |
| 1230374 | 12/1987 | Canada . |
| 2008156 | 1/1991 | Canada . |
| 2355462 | 5/1974 | Germany . |
| 2124877 | 2/1984 | United Kingdom . |

OTHER PUBLICATIONS

"Treshold 60–Cycle Fibrillating Currents" C.F. Dalziel, AIEE Winter General Meeting New York N.Y. Jan. 31–Feb. 5, 1960, pp. 667–673.

"Reevaluation of Lethal Electric Currents" C.F. Daizel, IEEE Transactions on Industry and General Applications, Sep./Oct. 1968, pp. 467–476.

Primary Examiner—Peter S. Wong
Assistant Examiner—Bao Q. Vu
Attorney, Agent, or Firm—Goudreau Gage Dubuc & Martineau Walker

[57] ABSTRACT

The neutralizing system comprises a low impedance current transformer for detecting an alternating stray current flowing through a ground return circuit in the proximity of an animal susceptible to be subjected to this stray current and the corresponding alternating stray voltage. The current transformer has a 1:1 primary-to-secondary transformation ratio. The neutralizing device further comprises a chain of amplification responsive to the alternating stray current detected by the current transformer to produce an alternating compensating current having an amplitude and phase respectively related to the amplitude and phase of the detected alternating stray current. Finally, a magnetic coupling circuit magnetically couples the alternating compensating current to the ground return circuit in view of inducing in that ground return circuit an alternating compensating voltage adding to the alternating stray voltage to substantially cancel this stray voltage and, a consequence the stray current.

21 Claims, 3 Drawing Sheets

U.S. PATENT DOCUMENTS

| | | | |
|---|---|---|---|
| 4,401,055 | 8/1983 | Street et al. | 119/14.03 |
| 4,513,830 | 4/1985 | Persbeck et al. | 177/1 |
| 4,542,302 | 9/1985 | Griffioen | 307/326 |
| 4,551,633 | 11/1985 | Winter et al. | 307/147 |
| 4,573,098 | 2/1986 | Williston | 361/42 |
| 4,756,274 | 7/1988 | Rubino | 119/14.08 |
| 4,766,847 | 8/1988 | Venczel et al. | 119/29 |
| 4,816,956 | 3/1989 | Hertz et al. | 361/42 |
| 4,922,855 | 5/1990 | Tomizawa et al. | 119/14.15 |
| 5,052,341 | 10/1991 | Woolford et al. | 119/14.02 |
| 5,121,711 | 6/1992 | Aine | 119/29 |
| 5,321,318 | 6/1994 | Montreuil | 307/326 |
| 5,487,359 | 1/1996 | Montreuil | 119/14.17 |

MAGNETICALLY COUPLED ALTERNATING STRAY CURRENT NEUTRALIZING METHOD AND SYSTEM

BACKGROUND OF THE INVENTION

1. Field of the Invention

The present invention relates to a method and system for neutralizing alternating stray voltage and current produced in a ground return circuit. In these stray voltage and current neutralizing method and system, an alternating compensating current is magnetically coupled to the ground return circuit in order to induce in this ground return circuit an alternating compensating voltage adding to the alternating stray voltage in view of cancelling the stray voltage and, as a consequence, the stray current.

2. Brief Description of the Prior Art

Stray current from the concrete floor of a livestock barn flows through either (a) the body of the animal(s) or (b) the metallic structures of that livestock barn including the grounding connection network of such metallic structures, or both. Obviously, the animal(s) feels (feel) and is (are) affected by this stray current; this usually causes a physiological reaction of the animal(s) resulting into abnormal health conditions.

An illustrative example is the physiological reaction of a human being when an electric current flows through his body (hand-trunk-foot). This physiological reaction can be summarized as follows:

- perception threshold: 1–3 mA (duration of 1 sec);
- strong sensation threshold: 3.5–8 mA (duration of 1 sec);
- contraction and release threshold: 8–15 mA (duration of 1 sec);
- fibrillation current threshold: $\geq 30$ mA (duration of 1 sec).

Stray current will cause symptoms specific to each species.

As a first example, cows will refuse to be milked and to enter the barn or milking parlour. They may also paw the ground and kick the milker. In the most critical situations, the cows will present problems of mastitis, reproduction, somatic cell count, etc.

As a second example, pigs can present similar symptoms; cases of cannibalism and mastitis, and problems of diarrhoea, temperature and constipation may be found. In the most critical cases, the death rate of the piglets may considerably increase.

OBJECTS OF THE INVENTION

An object of the present invention is therefore to provide a method and system for efficiently neutralizing stray voltage and current susceptible to affect an animal or animals bred or kept into a livestock barn.

Another object of the invention is to provide a method and system for neutralizing alternating stray voltage and current in a ground return circuit, in which an alternating compensating voltage is injected into the ground return circuit by means of a magnetic coupling.

SUMMARY OF THE INVENTION

More specifically, in accordance with the present invention, there is provided a method for neutralizing an alternating stray voltage produced in a ground return circuit and a corresponding alternating stray current flowing through the ground return circuit in the proximity of an animal susceptible to be affected by the alternating stray voltage and current. According to this method, the alternating stray current flowing through the ground return circuit is detected, and an alternating compensating current having an amplitude and phase respectively related to the amplitude and phase of the detected alternating stray current is produced in response to the detected stray current. Finally, the alternating compensating current is magnetically coupled to the ground return circuit so as to induce in that ground return circuit an alternating compensating voltage adding to the alternating stray voltage to substantially cancel this stray voltage and, as a consequence, the stray current.

Induction of the alternating compensating voltage through a magnetic coupling presents the following advantages:

- the stray voltage and current neutralizing system can be installed without rupture of the ground return circuit, which rupture is forbidden by many national codes of electricity;
- it constitutes a low cost design for injecting an alternating compensating voltage in view of establishing an artificial impedance in the ground return circuit;
- the alternating compensating voltage induced in the ground return circuit can be easily and quickly canceled upon detection of a fault current flowing through the ground return circuit;
- accurate control of the stray current to an amplitude as low as 1 mA is enabled.

To carry out the above method into practice, the present invention also provides a system comprising: sensor means for detecting the alternating stray current flowing through the ground return circuit; current generator means responsive to the detected alternating stray current for generating an alternating compensating current having an amplitude and phase respectively related to the amplitude and phase of the detected alternating stray current; and magnetic coupling means for magnetically coupling the alternating compensating current to the ground return circuit so as to induce in that ground return circuit an alternating compensating voltage adding to the alternating stray voltage to substantially cancel this stray voltage and, as a consequence, the stray current.

According to preferred embodiments:

- the sensor means comprises an output for delivering an alternating stray current representative signal, and the current generator means comprises means for amplifying this stray current representative signal to produce the alternating compensating current;
- the amplifying means comprises means for phase-shifting the stray current representative signal in order to produce an alternating compensating current phase-shifted by 180° with respect to the stray current representative signal;
- the amplifying means comprises an analog multiplier for multiplying the stray current representative signal by an amplitude-controlling voltage, and the system further comprises (a) a controller means responsive to the alternating stray current representative signal for producing a digital amplitude-controlling signal as a function of the amplitude of the stray current representative signal, and (b) a digital-to-analog converter for converting the digital amplitude-controlling signal to a direct current amplitude-controlling voltage;
- the system further comprises means for signaling non operation of the sensor means when the stray current representative signal lowers under a predetermined amplitude threshold, and means for interrupting supply of the alternating compensating current to the magnetic coupling means when non operation of the sensor means is signaled;

the system comprises means for detecting a phase error through detection of an increase of the amplitude of the stray current representative signal upon turning on the system, and means for phase-shifting the stray current representative signal by an angle of 180° in response to detection of this phase error;

the system comprises means for detecting the amplitude of the alternating compensating current supplied to the magnetic coupling means and for interrupting supply of the alternating compensating current to the magnetic coupling means when the amplitude of the compensating current oversteps a given amplitude threshold; and the system comprises means for detecting the amplitude of the stray current representative signal and for interrupting supply of the alternating compensating current to the magnetic coupling means when the amplitude of the alternating stray current representative signal oversteps a given amplitude threshold.

Advantageously, the sensor means comprises a low impedance current transformer having a 1:1 primary-to-secondary transformation ratio, and the magnetic coupling circuit comprises:

a first conductor supplied with the alternating compensating current;

a second conductor connected to the ground return circuit; and a magnetic core for magnetically coupling the first and second conductors whereby the alternating compensating current flowing in the first conductor induces in the magnetic core a magnetic flux itself inducing in the second conductor the alternating compensating voltage.

The objects, advantages and other features of the present invention will become more apparent upon reading of the following non restrictive description of preferred embodiments thereof, given by way of example only with reference to the accompanying drawings.

DETAILED DESCRIPTION OF THE PREFERRED EMBODIMENTS

In the different figures of the appended drawings, the corresponding elements are identified by the same reference numerals.

The origin of the alternating stray currents susceptible to flow through the body of an animal kept in a livestock barn will be first discussed.

A tingle voltage is a potential difference existing between two points susceptible to be contacted simultaneously by an animal to cause a flow of current through the animal's body. A tingle voltage can also be defined as a potential difference between two points caused by a flow of current through the body of an animal.

A tingle voltage can produce a flow of current both (a) through the body of the animal from the concrete floor of the livestock barn toward metallic structures of that livestock barn contacted by the animal (touch voltage circuit), and (b) through the animal's body from one paw to the other (step voltage circuit).

Figure 1:
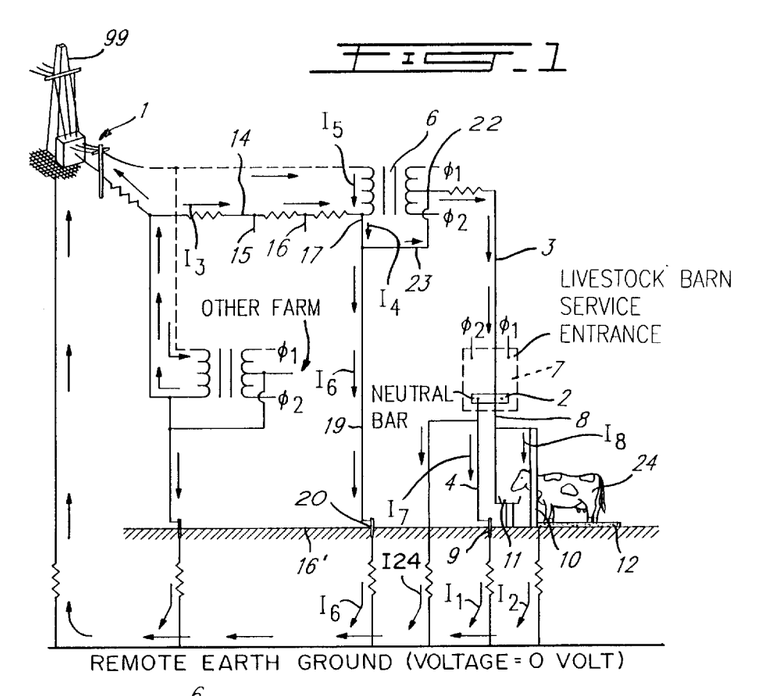
FIG. 1 is a schematic diagram of a medium-voltage electric distribution network illustrating the origin of stray voltage and current.

Referring to FIG. 1 of the appended drawings, in a farm, unbalance of the charges supplied by the respective phases of the utility network 1 causes a high flow of alternating current 14 through the neutral conductor 3 electrically interconnecting the secondary neutral 22 of the farm transformer 6 and the neutral bar 2 of the service entrance 7 of the livestock barn. This produces a neutral earth voltage on the network of neutral and grounding conductors such as 3, 4 and 8. As illustrated in FIG. 1, the neutral and grounding conductors 3, 4 and 8 are interconnected through the neutral bar 2 of the service entrance 7.

As metallic structures such as individual stalls 10 and animal-operated water bowls 11 (for example for cows such as 24) are connected to the neutral bar 2 through the grounding conductor 8, the neutral earth voltage also appears on these metallic structures. As can be appreciated by one of ordinary skill in the art, this neutral earth voltage will generate alternating ground currents 11 and 12 as illustrated in FIG. 1.

Moreover, in North America, the structure of the electric distribution networks such as 1 causes the flow of a small portion of the primary supply alternating current toward the ground, and this current tends to return to its source (substation 99) through the earth.

Still referring to FIG. 1, the current 13 flowing through the primary neutral conductor 14 of the utility medium-voltage network 1 creates a voltage drop in that conductor 14. A portion 14 of the primary current 15 flowing through the primary winding of the farm transformer 6 therefore tends to return to the substation 99 through the earth. As the grounding connections such as 15 and 16 of the primary neutral conductor 14 have a certain resistance, a potential with respect to the earth ground (0 volt) appears on the primary neutral 17 of transformer 6.

The Ohm's law predicts such behaviour of a medium-voltage network; the potential on the primary neutral 17 cannot be equal to 0 volt if the resistance of the primary neutral conductor 14 is not equal to 0 ohm or the resistance of the grounding connections such as 15 and 16 is not equal to 0 ohm. As the two latter conditions cannot be reached, it is impossible to cancel the voltage on the primary neutral 17. The intensity of the current 16 flowing in the grounding conductor 19 and the ground rod 20 is of course function of the potential of the primary neutral 17 and the resistance of the ground connection 16; FIG. 1 shows that the grounding conductor 19 and the ground rod 20 electrically connect the primary neutral 17 to the earth. The same applies to the other ground connections such as 15.

The potential on the primary neutral 17 is transmitted to the secondary neutral 22 of the farm transformer 6 as these two neutrals are interconnected at the transformer 6 through a conductor 23. The voltage on the primary neutral 17 therefore causes a flow of current I7 through the conductor 23, the neutral conductor 3, the neutral bar 2, the grounding conductor 4 and the ground rod 9, this current I7 increasing the amplitude of the ground current I1. The voltage on the primary neutral 17 also causes a flow of current I8 in the circuit formed by the conductor 23, the neutral conductor 3, the neutral bar 2, the grounding conductor 8, and the metallic structures such as the stalls 10 and the water bowls 11, the current I8 raising the value of the ground current I2.

As can be appreciated by one of ordinary skilled in the art, bypass currents such as I1, I2 and I6 add and flow in the soil toward the substation 99. Due to the complex nature of the soil, the distribution of the current at the surface of the ground is not uniform. This alternating stray current, flowing through the soil, tends to raise toward the primary neutral of the utility's network 1 and is therefore attracted by the high humidity level and the alkaline nature of the concrete floor 12 of the livestock barn.

Attracted by the concrete floor 12 and the manure pit, if present, of the livestock barn, the alternating stray current will flow through the body of the cow 24 or other animal (touch or step circuit) to reach the metallic structures (stalls 10, water bowls 11, manure remover (not shown), etc.), and then will flow toward the grounding and neutral conductors (see for example 3 and 8 in FIG. 1) to thereby generate a corresponding alternating stray voltage in the ground return circuit (including the conductors such as 3, 4 and 8, structures 10 and 11, etc.).

Figure 3:
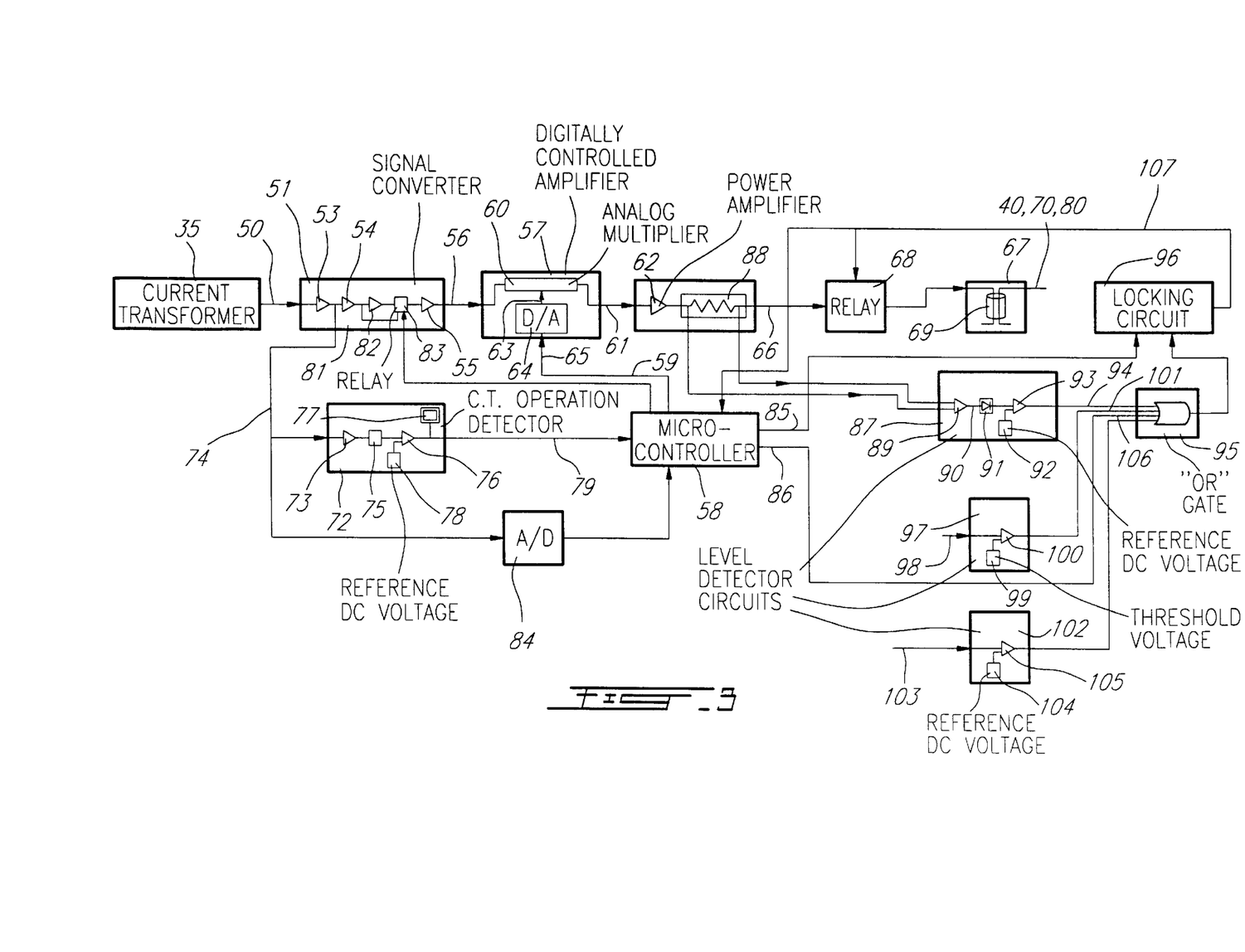
FIG. 3 is a block diagram of the electronic circuit of a stray voltage and current neutralizing system in accordance with the present invention.

Referring now to FIG. 3, a block diagram of the electronic circuit of the stray voltage and current neutralizing system in accordance with the present invention is illustrated.

The alternating stray current is sensed through a low impedance current transformer 35 having a 1:1 primary-to-secondary ratio. The use of a current transformer 35 has been dictated by the following two requirements:

in accordance with many national codes of electricity, including the Canadian Code of Electricity, rupture of a grounding conductor to insert a current measuring equipment is forbidden; the use of the current transformer 35 makes such a rupture unnecessary; and the high level of noise characteristic of a farm introduces an unacceptable error in low-amplitude voltage measurements; a measurement of the alternating stray current flowing through the ground return circuit is more accurate.

The stray voltage and current neutralizing system also comprises a magnetic coupling circuit 67 to induce in the ground return circuit an alternating compensating voltage. This alternating compensating voltage adds to the alternating stray voltage to substantially cancel the alternating stray voltage and, as a consequence, the alternating stray current.

Three methods for reading the alternating stray voltage and for injecting the alternating compensatory voltage are available. The choice of any of these three methods depends on the structure of the electric installation of the livestock barn.

Figure 2A:
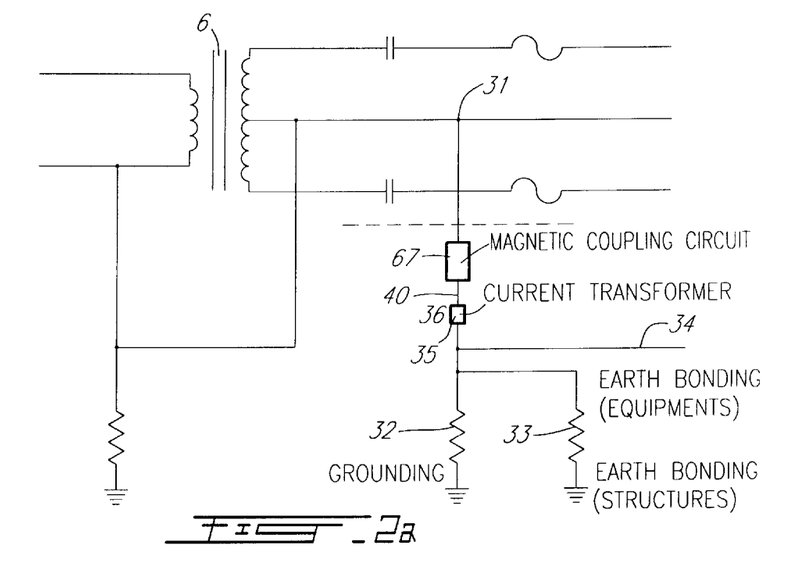
FIG. 2a is a schematic diagram illustrating a first method for connecting a stray voltage and current neutralizing system in accordance with the present invention to an electric installation of livestock barn.

First Method (FIG. 2a)

In the first embodiment of FIG. 2a, the magnetic coupling circuit 67 is installed on a conductor 40 of the ground return circuit between the primary/secondary neutral 31 and the grounding section (illustrated by a resistance 32), the earth bonding section related to the metallic structures such as the stall 10 and the water bowl 11 (identified by the resistance 33) and the earth bonding section related to the electric equipments (line 34) of the ground return circuit.

The low impedance current transformer 35 having a 1:1 primary-to-secondary transformation ratio measures the amplitude of the alternating stray current and the presence of harmonics at point 36, between the magnetic coupling circuit 67 and the grounding section 32 and the earth bonding sections 33 and 34 of the ground return circuit.

In the following description, it will be seen that, in response to this current measurement, the magnetic coupling circuit 67 is used to magnetically induce in the conductor 40 an alternating compensating voltage suitable to substantially cancel both the alternating stray voltage and current. The alternating compensating voltage corresponds to:

$$E = AR_t$$

where E is the alternating compensating voltage, A is the amplitude of the stray current being measured, and $R_t = R_{32} + R_{33} + R_{34}$. $R_{32}$ is the resistance caused by the grounding circuit section 32 of the ground return circuit, $R_{33}$ is the resistance due to the earth bonding section 33 of the ground return circuit related to the metallic structures, and $R_{34}$ is the earth bonding section 34 of the ground return circuit related to the equipments.

The stray current flowing in the conductor 40 between (i) the primary/secondary neutral 31 and (ii) the grounding section 32 and the earth bonding sections 33 and 34 of the ground return circuit will not be completely cancelled but reduced to a level of about 1 mA.

This method will eliminate any touch voltage circuit and any step circuit voltage, i.e. any circuit through which a current flows through the body of an animal, for example the cow 24, from the concrete floor 12 to the metallic structures such as 10 and 11, and any step current circuit allowing current to flow through the body of the animal from one paw to the other.

Figure 2B:
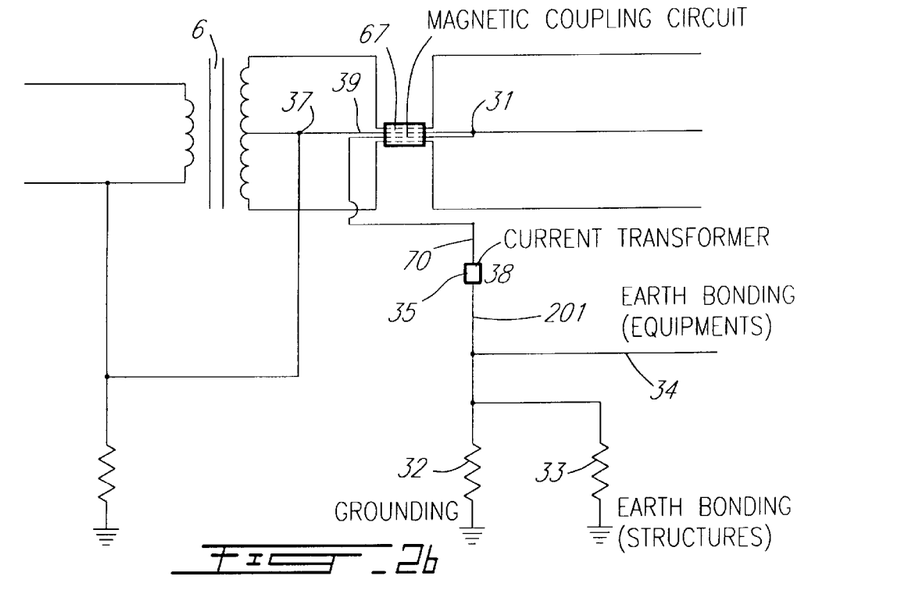
FIG. 2b is a schematic diagram illustrating a second method for connecting a stray voltage and current neutralizing system in accordance with the present invention to the electric installation of a livestock barn.

Second Method (FIG. 2b)

The magnetic coupling circuit 67 can be located between the transformer 6 and the main switch (not shown) of the livestock barn. This position enables control of the voltage of the primary neutral 37 at the level of the secondary neutral 31, and the ground return circuit.

The current transformer 35 is positioned on the conductor 70 at point 38 of the ground return circuit to measure any stray current, the current alternation as well as the harmonics. In response to this measurement, the magnetic coupling circuit is used to induce the alternating compensating voltage given by the relation:

$$E = AR_t$$

where E is the alternating compensating voltage being induced, A is the amplitude of the alternating stray current being measured, and $R_t = R_{32} + R_{33} + R_{34}$.

Again, the alternating stray current flowing in conductor 70 between (i) the secondary neutral 31 and (ii) the grounding section 32 and the earth bonding sections 33 and 34 of the ground return circuit will not be completely cancelled but reduced to a level of about 1 mA.

This second method will eliminate any touch voltage circuit and/or any step voltage circuit, i.e. any circuit in which a current flows through the body of an animal, such as the cow 24, from the concrete floor 12 to the metallic structures such as 10 and 11 and any circuit enabling stray current to flow through the body of the animal from one paw to the other.

Figure 2C:
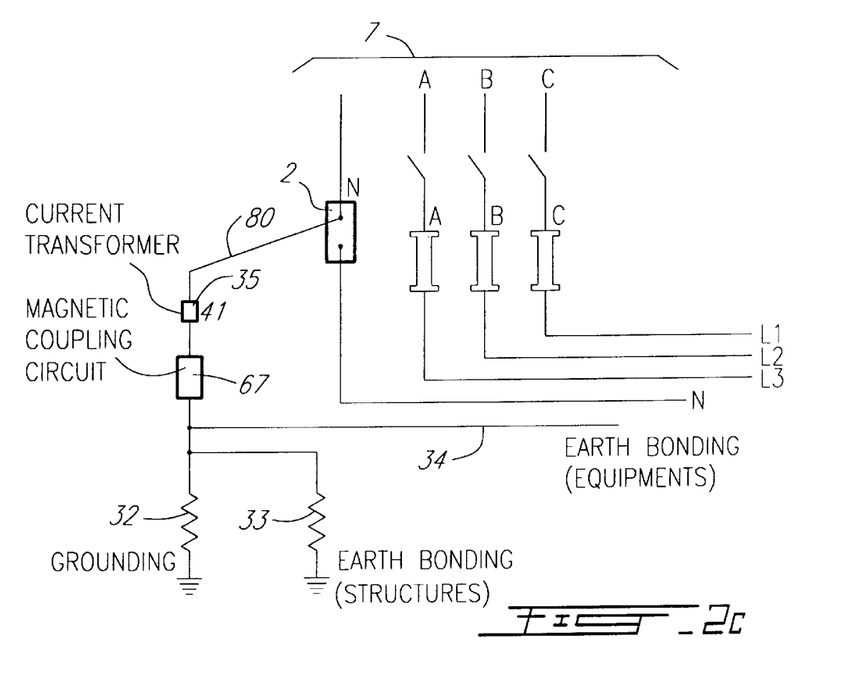
FIG. 2c is a schematic diagram illustrating a third method for connecting a stray voltage and current neutralizing system in accordance with the present invention to the electric installation of a livestock barn.

Third Method (FIG. 2c)

The magnetic coupling circuit 67 is mounted on a conductor 80 of the ground return circuit, interconnecting the neutral bar 2 of the service entrance 7 of the livestock barn and the grounding section 32 and earth bonding section 33 and 34 of the ground return circuit.

The low impedance current transformer 35 having a 1:1 primary-to-secondary transformation ratio is positioned on the conductor 80 at point 41, between the neutral bar 2 and the magnetic coupling circuit 67, to measure any stray current, the current alternation as well as the harmonics. In response to this measurement, the magnetic coupling circuit 67 is used to induce the alternating compensating voltage given by the relation:

$$E = AR_t$$

where E is the alternating compensating voltage being induced, A is the amplitude of the alternating stray current being measured, and $R_t = R_{32} + R_{33} + R_{34}$.

Again, the alternating stray current flowing in conductor 80 between (i) the neutral bar 2 and (ii) the grounding section 32 and the earth bonding sections 33 and 34 of the ground return circuit will not be completely cancelled but reduced to a level of about 1 mA.

This third method will eliminate any touch voltage circuit and/or any step voltage circuit, i. e. any circuit in which a current flows through the body of an animal, such as the cow 24, from the concrete floor 12 to the metallic structures such as 10 and 11 and any circuit enabling stray current to flow through the body of the animal from one paw to the other.

Referring back to FIG. 3 of the appended drawings, the electronic circuit of the stray voltage and current neutralizing system will now be described.

An alternating stray current representative signal 50 is produced by the secondary winding (not shown) of the current transformer 35. Signal 50 is applied to the input of a signal converter 51.

The alternating stray current representative signal 50 is supplied to an isolation buffer 53. The signal at the output of the buffer 53 is pre-amplified by an amplifier 54 having a gain of 5000. The pre-amplified signal is itself amplified by means of a second amplifier 55 having a gain of 2. Between the amplifiers 54 and 55 is mounted an inverter 82 for inverting the amplified, alternating stray current representative signal 81 from the amplifier 54. Indeed, the alternating compensating voltage induced in the ground return circuit must be substantially out of phase by 180° with respect to the alternating stray voltage and have substantially the same amplitude as this alternating stray voltage to substantially cancel this stray voltage.

A digitally controlled amplifier 57 has a gain which is adjustable by means of a micro-controller 58 through a line 59. More specifically, the amplifier 57 comprises an analog multiplier 60 supplied with the amplified signal 56 from the converter 51 to thereby control the amplitude of the signal 61 transmitted to a power amplifier 62. More specifically, the analog multiplier 60 multiplies the signal 56 by a direct current (dc) amplitude-controlling voltage 63. The dc voltage 63 is produced by a digital-to-analog (D/A) converter 64 in response to a digital amplitude-controlling signal 65 transmitted by the micro-controller 58 to the D/A converter 64 through the line 59. In the preferred embodiment, the full range of the digital amplitude-controlling signal 65 from the micro-controller 58 corresponds to the range 0–100% of the signal 61 from the digitally controlled amplifier 57.

The power amplifier 62 has an input supplied with the signal 61 from the digitally controlled amplifier 57 to produce an alternating compensating current on its output 66, to supply the magnetic coupling circuit 67. Supply of the alternating compensating current 66 to the magnetic coupling circuit 67 is enabled and interrupted by means of a relay 68. The magnetic coupling circuit 67 essentially consists of a core 69, made of soft iron. The conductor(s) (40 in FIG. 2a, non identified in FIG. 2b, or 80 in FIG. 2c) and a conductor 70 of reduced cross section connected to the output 66 of the power amplifier 62 through the relay 68 both pass through the core 69 to establish a magnetic link between these two conductors, and thereby convert the compensating alternating current from the output 66 to the alternating compensating voltage induced in the ground return circuit to substantially cancel the stray voltage and current.

The stray voltage and current neutralizing system of FIG. 3 further comprises a current transformer (C.T.) operation detector 72 to determine whether the current transformer 35 is adequately connected in the circuit and properly operates. The C.T. operation detector 72 comprises an amplifier 73 for amplifying a portion 74 of the signal at the output of the buffer circuit 53, a rectifying circuit 75 for rectifying the output signal from the amplifier 73 and thereby producing a dc voltage, a comparator 76 for comparing the dc voltage at the output of the rectifying circuit 75 with a reference dc voltage 78, and a visual indicator 77, for example a light-emitting-diode which glows when the dc voltage at the output of the rectifying circuit 75 is lower than the reference dc voltage 78 to thereby indicate that the current transformer 35 is no longer operating. When the dc voltage at the output of the rectifying circuit 75 is lower than the reference dc voltage 78, the corresponding signal at the output of the comparator 76 is transmitted to the micro-controller 58 through a line 79 to indicate to the micro-controller 58 that the current transformer 35 is no longer operating, for example disconnected.

As indicated in the foregoing description, the phase of the alternating signal 81 at the output of the amplifier 54 is inverted (phase-shifted by an angle of 180°) by an inverter 82 before being supplied to the amplifier 55 through a relay 83. The micro-controller 58 measures the alternating signal 74 through an analog-to-digital (A/D) converter 84. When the amplitude of the signal 74 increases upon turning on the stray voltage and current neutralizing system of FIG. 3, this indicates a phase error due to inverted connections of the current transformer 35. Such a phase error will be automatically corrected by the micro-controller 58 by switching the relay 83 to by-pass the inverter 82. A function of the micro-controller 58 is therefore to switch the relay 83 in view of correcting the above mentioned phase error.

Another function fulfilled by the micro-controller 58 is to control turning on of the magnetic coupling circuit 67. For that purpose, the micro-controller 58 supplies, when no adverse conditions as described hereinafter are detected by the micro-controller 58, a signal 85 to a locking circuit 96. In response to the signal 85, the locking circuit supplies an output signal 107 suitable to close the contacts of the electromechanical relay 68 and thereby supply the magnetic coupling circuit 67 with the alternating compensating current from the power amplifier 62 and induce in the ground return circuit the alternating compensating voltage.

The signal 107 on the output of the locking circuit 96 is also supplied to the micro-controller 58 to inform this micro-controller 58 about the locking state of circuit 96 and the switching state of the electromechanical relay 68.

A further function of the micro-controller 58 is to measure the stray current through the A/D converter 84 and to control from this measurement the gain of the digitally controlled amplifier 57 in view of substantially cancelling the stray voltage and current being measured through an appropriate control of the level of the alternating compensating current 66 applied to the magnetic coupling circuit 67 through the relay 68 to induce an alternating compensating voltage of corresponding amplitude.

When the output signal from the C.T. operation detector 72 indicates non operation of the current transformer 35, the micro-controller 58 delivers an output signal 86 to an input 106 of the logic "OR" gate 95 for opening the contacts of the electromechanical relay 68 through the locking circuit 96 to thereby interrupt supply of the alternating compensating current to the magnetic coupling circuit 67.

A first level detector circuit 87 is provided for interrupting the operation of the magnetic coupling circuit 67 when the alternating compensating current 66 on the output of the power amplifier 62 is higher than a predetermined threshold. The alternating compensating current 66 is measured through a 1-ohm resistor 88 connected in series with the power amplifier 62, the relay 68 and the magnetic coupling circuit 62, via a differential amplifier 89. The signal on the output 90 of the differential amplifier 89 is rectified by a rectifier 91, and this rectified signal is compared with a reference dc voltage 92 by means of a comparator 93. The signal on the output of the comparator 93 is supplied to an input 94 of the logic "OR" gate 95. When the rectified signal from the rectifier 91 has an amplitude higher than the amplitude of the reference voltage 92, the signal at the output of the comparator 93 is a high logic level signal; this means that the alternating compensating current 66 from the power amplifier 62 is higher than the predetermined threshold. The high logic level signal on the input 94 of the logic "OR" gate 95 is transmitted to the locking circuit 96. In response to the high logic level signal from the "OR" gate 95, the locking circuit 96 supplies the output signal 107 for opening the electromechanical relay 68.

A second level detector circuit 97 comprises an input 98 for receiving a signal representative of the voltage between the primary/secondary neutral 31 and the earth. When this voltage representative signal is higher than a threshold dc voltage 99, a comparator 100 produces on an input 101 of the "OR" gate 95 a high logic level signal transmitted to the locking circuit 96 through the "OR" gate 95. In response to the high logic level signal from the "OR" gate 95, the locking circuit 96 opens the electromechanical relay 68 to interrupt supply of the magnetic coupling circuit 67 with the alternating compensating current from the power amplifier 62. Therefore, upon occurrence of an electric fault causing a higher voltage between the primary/secondary neutral 31 and the earth, the magnetic coupling circuit 67 is disconnected and no longer supplied with the alternating compensating current 66. Therefore, the stray voltage and current neutralizing system according to the invention causes no interference to the operation of the electric installation upon occurrence of an electric fault.

A third level detector circuit 102 has an input 103 responsive to a signal representative of fault current in the ground return circuit. When the amplitude of this fault current representative signal oversteps a reference dc voltage 104, a comparator 105 supplies an input 107 of the "OR" gate 95 with a high logic level signal transmitted, via the "OR" gate 95, to the locking circuit 96. In response to the high logic level signal on the input 106 of the "OR" gate 95, the locking circuit 96 opens the electromechanical relay 68 to interrupt supply of the magnetic coupling circuit with the alternating compensating current 66 from the power amplifier 62.

Again, the stray voltage and current neutralizing system according to the invention causes no interference to the operation of the electric installation upon occurrence of an electric fault.

Although the present invention has been described hereinabove with reference to a preferred embodiment thereof, this embodiment can be modified at will, within the scope of the appended claims, without departing from the spirit and nature of the subject invention.

What is claimed is:

1. A system for neutralizing an alternating stray voltage produced in a ground return circuit and a corresponding alternating stray current flowing through the ground return circuit in the proximity of an animal susceptible to be affected by the alternating stray voltage and current, comprising:

sensor means for detecting the alternating stray current flowing through the ground return circuit;

current generator means responsive to the detected alternating stray current for generating an alternating compensating current having an amplitude and phase respectively related to the amplitude and phase of the detected alternating stray current; and magnetic coupling means for magnetically coupling the alternating compensating current to the ground return circuit so as to induce in said ground return circuit an alternating compensating voltage adding to said alternating stray voltage to substantially cancel the alternating stray voltage and, as a consequence, the alternating stray current.

2. A system for neutralizing alternating stray voltage and current as recited in claim 1, wherein:

said sensor means comprises an output for delivering an alternating signal representative of the detected alternating stray current; and said current generator means comprises means for amplifying the alternating stray current representative signal from the output of the sensor means to produce the alternating compensating current.

3. A system for neutralizing alternating stray voltage and current as recited in claim 2, wherein the amplifying means comprises means for phase-shifting said alternating stray current representative signal in order to produce an alternating compensating current phase-shifted with respect to said alternating stray current representative signal.

4. A system for neutralizing alternating stray voltage and current as recited in claim 2, wherein the amplifying means comprises an analog multiplier for multiplying the alternating stray current representative signal by an amplitude-controlling voltage.

5. A system for neutralizing alternating stray voltage and current as recited in claim 4, further comprising:

a controller means responsive to the alternating stray current representative signal for producing a digital amplitude-controlling signal as a function of the amplitude of said alternating stray current representative signal; and a digital-to-analog converter for converting the digital amplitude-controlling signal to a direct current voltage constituting said amplitude-controlling voltage.

6. A system for neutralizing alternating stray voltage and current as recited in claim 2, further comprising means for signaling non operation of the sensor means when said alternating stray current representative signal lowers under a predetermined amplitude threshold.

7. A system for neutralizing alternating stray voltage and current as recited in claim 2, further comprising:

means for detecting a phase error through detection of an increase of the amplitude of the alternating stray current representative signal upon turning on the stray voltage and current neutralizing system; and means for phase-shifting said alternating stray current representative signal in response to detection of said phase error.

8. A system for neutralizing alternating stray voltage and current as recited in claim 7, in which said phase-shifting means comprises an inverter circuit for phase-shifting the alternating stray current representative signal by an angle of 180°.

9. A system for neutralizing alternating stray voltage and current as recited in claim 6, further comprising means for interrupting supply of the alternating compensating current to the magnetic coupling means when non operation of the sensor means is signaled by the signaling means.

10. A system for neutralizing alternating stray voltage and current as recited in claim 1, further comprising means for detecting the amplitude of the alternating compensating current supplied to the magnetic coupling means and for interrupting supply of the alternating compensating current to the magnetic coupling means when the amplitude of said alternating compensating current oversteps a given amplitude threshold.

11. A system for neutralizing alternating stray voltage and current as recited in claim 2, further comprising means for detecting the amplitude of the alternating stray current representative signal and for interrupting supply of the alternating compensating current to the magnetic coupling means when the amplitude of said alternating stray current representative signal oversteps a given amplitude threshold.

12. A system for neutralizing an alternating stray voltage produced in a ground return circuit and a corresponding alternating stray current flowing through the ground return circuit in the proximity of an animal susceptible to be affected by the alternating stray voltage and current, comprising:

a current sensor for detecting the alternating stray current flowing through the ground return circuit;

a current generator responsive to the detected alternating stray current for generating an alternating compensating current having an amplitude and phase respectively related to the amplitude and phase of the detected alternating stray current; and a magnetic coupling circuit for magnetically coupling the alternating compensating current to the ground return circuit so as to induce in said ground return circuit an alternating compensating voltage adding to said alternating stray voltage to substantially cancel the alternating stray voltage and, as a consequence, the alternating stray current.

13. A system for neutralizing alternating stray voltage and current as recited in claim 12, in which said current sensor comprises a current transformer.

14. A system for neutralizing alternating stray voltage and current as recited in claim 13, wherein the current transformer is a low impedance current transformer having a 1:1 primary-to-secondary transformation ratio.

15. A system for neutralizing alternating stray voltage and current as recited in claim 12, wherein the magnetic coupling circuit comprises:

a first conductor supplied with the alternating compensating current;

a second conductor connected to the ground return circuit; and a magnetic core for magnetically coupling the first and second conductors whereby the alternating compensating current flowing in the first conductor induces in the magnetic core a magnetic flux itself inducing in the second conductor the alternating compensating voltage.

16. A method for neutralizing an alternating stray voltage produced in a ground return circuit and a corresponding alternating stray current flowing through the ground return circuit in the proximity of an animal susceptible to be affected by the alternating stray voltage and current, comprising the steps of:

detecting the alternating stray current flowing through the ground return circuit;

producing, in response to the detected alternating stray current, an alternating compensating current having an amplitude and phase respectively related to the amplitude and phase of the detected alternating stray current; and magnetically coupling said alternating compensating current to said ground return circuit so as to induce in said ground return circuit an alternating compensating voltage adding to said alternating stray voltage to substantially cancel the alternating stray voltage and, as a consequence, the alternating stray current.

17. A method for neutralizing alternating stray voltage and current as recited in claim 16, wherein:

the detecting step comprises a step of producing an alternating signal representative of the detected alternating stray current; and the compensating current producing step comprises a step of amplifying the alternating stray current representative signal to produce the alternating compensating current.

18. A method for neutralizing alternating stray voltage and current as recited in claim 17, wherein the amplifying step comprises a step of phase-shifting the alternating stray current representative signal in order to produce an alternating compensating current phase-shifted with respect to said alternating stray current representative signal.

19. A method for neutralizing alternating stray voltage and current as recited in claim 16, further comprising the steps of:

detecting the amplitude of the alternating compensating current; and limiting the amplitude of the alternating compensating current to a given amplitude.

20. A system for neutralizing an alternating stray voltage produced in a ground return circuit and a corresponding alternating stray current flowing through the ground return circuit in the proximity of an animal susceptible to be affected by the alternating stray voltage and current, comprising:

sensor means for detecting the alternating stray current flowing through the ground return circuit;

current generator means responsive to the detected alternating stray current for generating an alternating compensating current having an amplitude and phase respectively related to the amplitude and phase of the detected alternating stray current;

magnetic coupling means for magnetically coupling the alternating compensating current to the ground return circuit so as to induce in said ground return circuit an alternating compensating voltage adding to said alternating stray voltage to substantially cancel the alternating stray voltage and, as a consequence, the alternating stray current; and means for detecting the amplitude of the alternating compensating current supplied to the magnetic coupling means and for interrupting supply of the alternating compensating current to the magnetic coupling means when the amplitude of said alternating compensating current oversteps a given amplitude threshold.

21. A system for neutralizing an alternating stray voltage produced in a ground return circuit and a corresponding alternating stray current flowing through the ground return circuit in the proximity of an animal susceptible to be affected by the alternating stray voltage and current, comprising:

sensor means for detecting the alternating stray current flowing through the ground return circuit;

current generator means responsive to the detected alternating stray current for generating an alternating compensating current having an amplitude and phase respectively related to the amplitude and phase of the detected alternating stray current; and magnetic coupling means for magnetically coupling the alternating compensating current to the ground return circuit so as to induce in said ground return circuit an alternating compensating voltage adding to said alternating stray voltage to substantially cancel the alternating stray voltage and, as a consequence, the alternating stray current; wherein:

said sensor means comprises an output for delivering an alternating signal representative of the detected alternating stray current;

said current generator means comprises means for amplifying the alternating stray current representative signal from the output of the sensor means to produce the alternating compensating current; and said system for neutralizing alternating stray voltage and current further comprising means for detecting the amplitude of the alternating stray current representative signal and for interrupting supply of the alternating compensating current to the magnetic coupling means when the amplitude of said alternating stray current representative signal oversteps a given amplitude threshold.

* * * * *